(No Model.) 6 Sheets—Sheet 1.

H. S. COMBS.
WIRE NETTING MACHINE.

No. 310,254. Patented Jan. 6, 1885.

WITNESSES
Samuel E. Thomas
N. S. Wright

INVENTOR
Hiram S. Combs
By W. W. Leggett
Attorney (No Model.)  6 Sheets—Sheet 2.

H. S. COMBS.
WIRE NETTING MACHINE.

No. 310,254.  Patented Jan. 6, 1885.

WITNESSES
Samuel E. Thomas,
N. S. Wright.

INVENTOR
Hiram S. Combs.
By W. W. Leggett
Attorney (No Model.)  6 Sheets—Sheet 3.
H. S. COMBS.
WIRE NETTING MACHINE.
No. 310,254.  Patented Jan. 6, 1885.
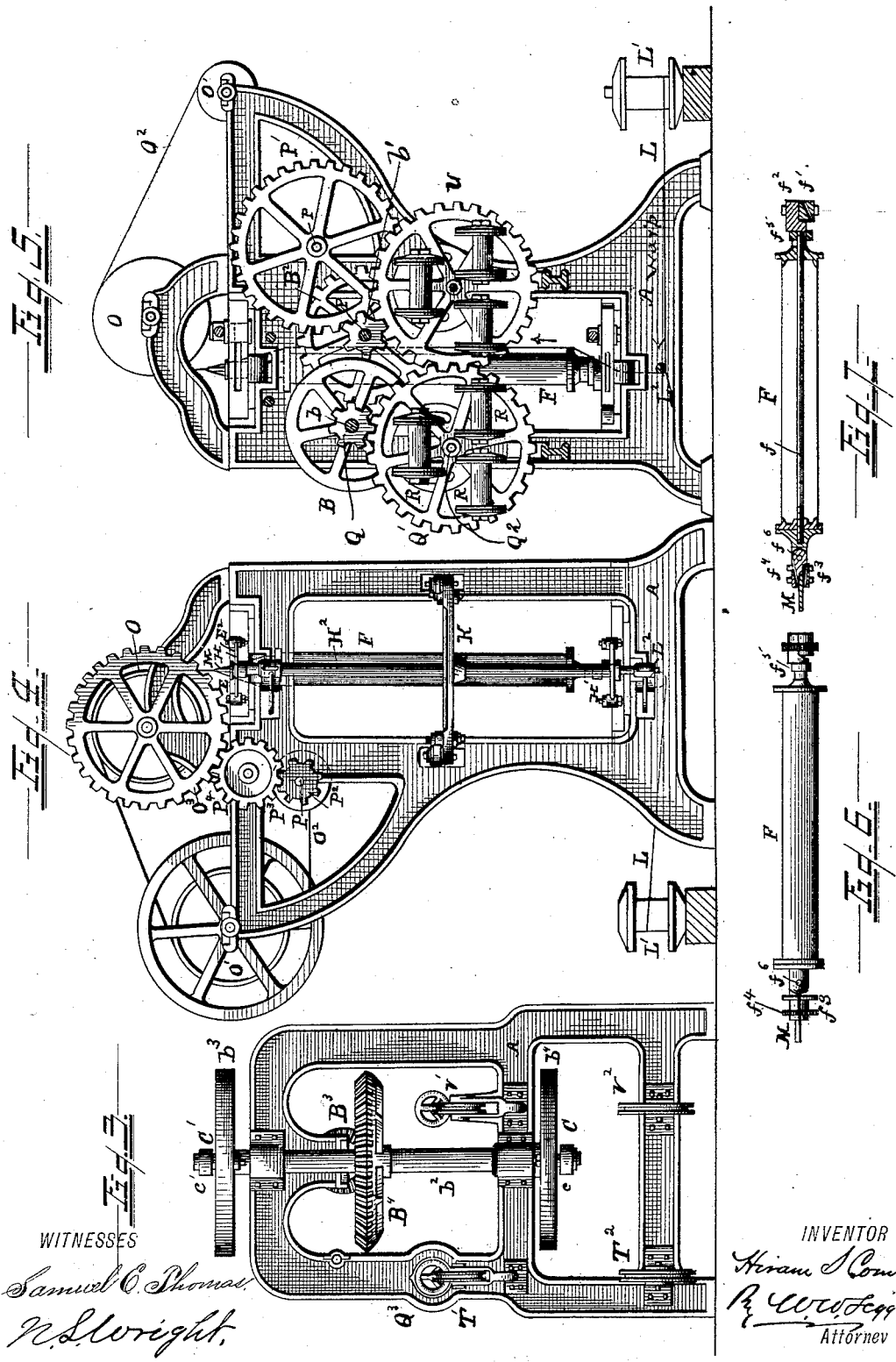
WITNESSES
Samuel C. Thomas
N. L. Wright
INVENTOR
Hiram S. Combs
R. W. Fegges
Attorney

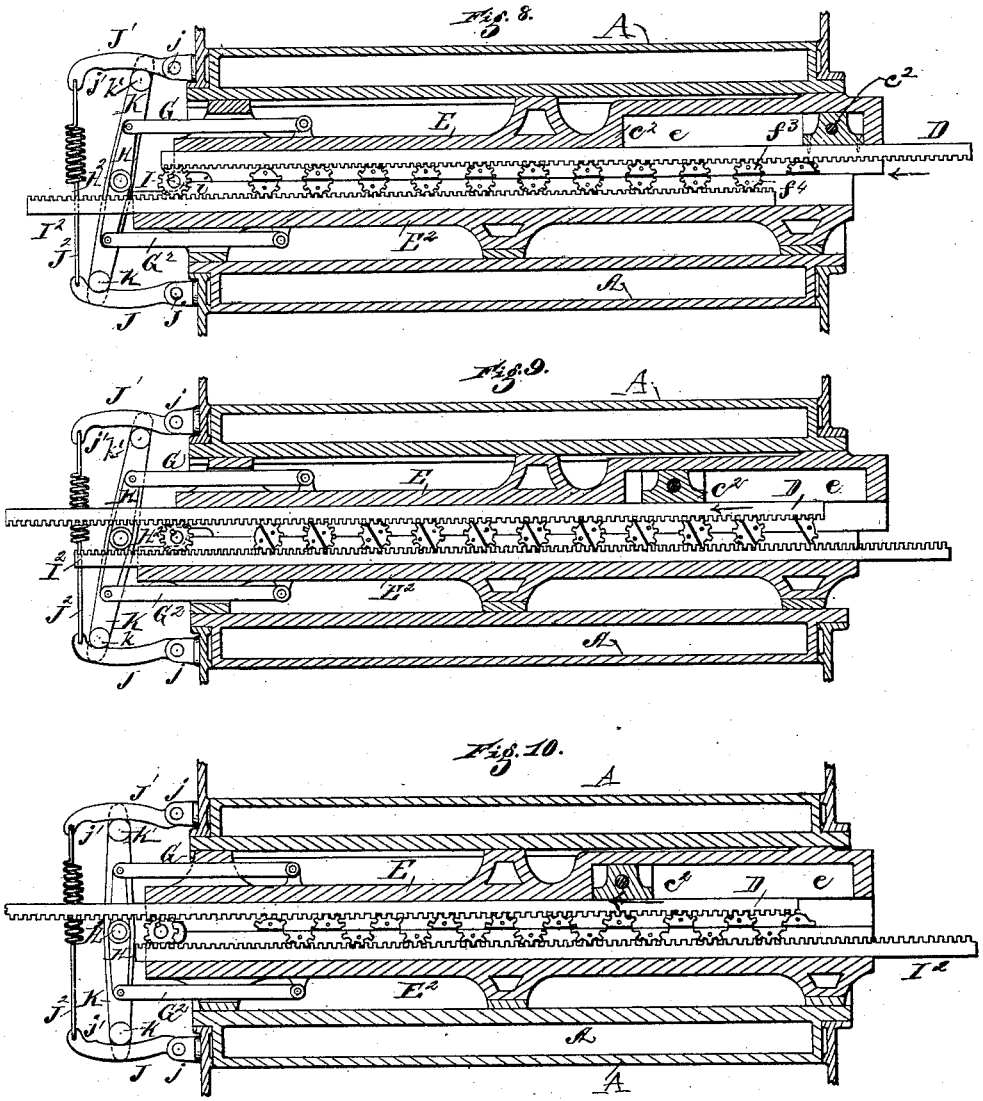

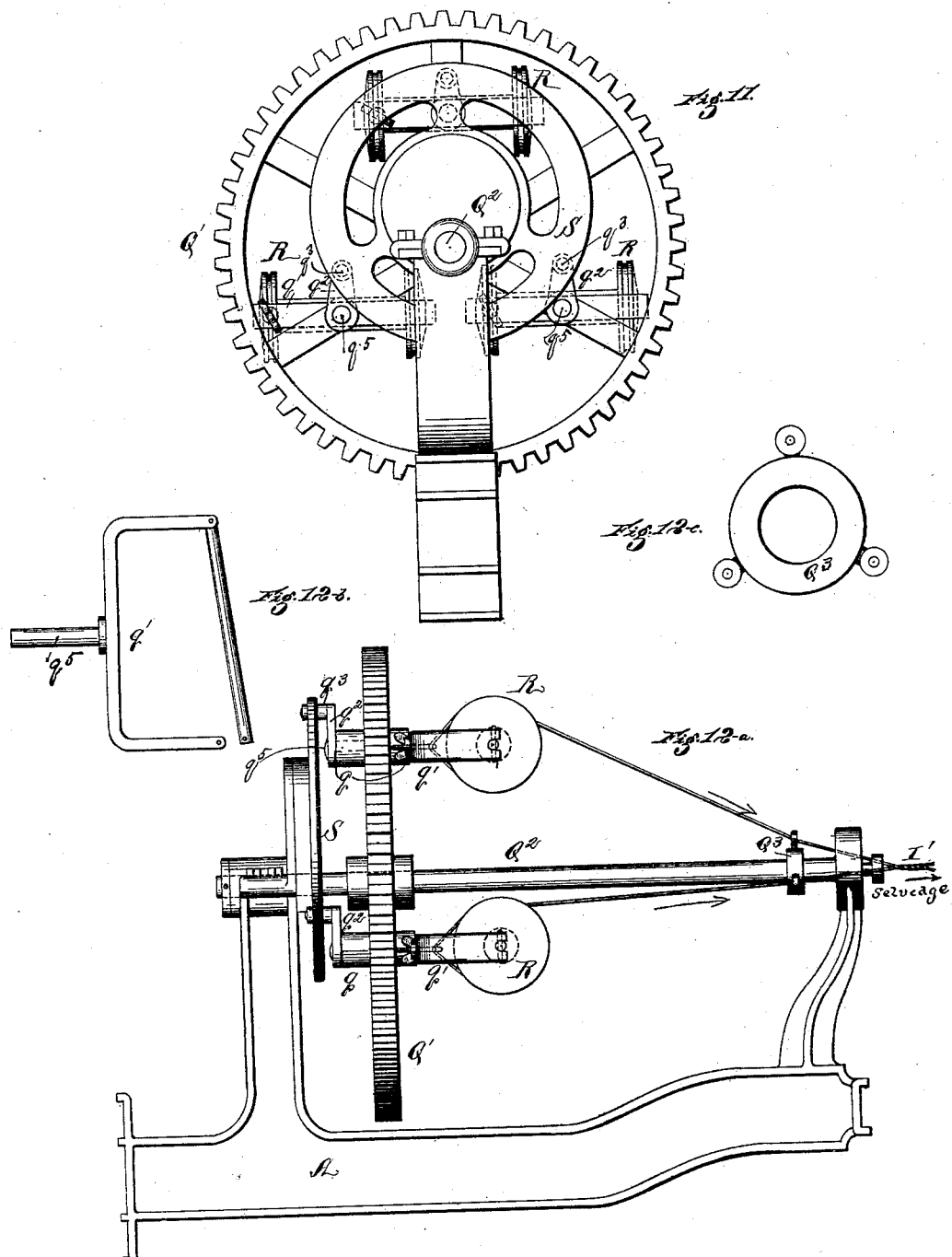

(No Model.) 6 Sheets—Sheet 6.

H. S. COMBS.
WIRE NETTING MACHINE.

No. 310,254. Patented Jan. 6, 1885.

WITNESSES
W.B. O'Dogherty
N.S. Wright

INVENTOR
Hiram S Combs
By W.W. Leggett
Attorney

UNITED STATES PATENT OFFICE.

HIRAM S. COMBS, OF DETROIT, MICHIGAN.

WIRE-NETTING MACHINE.

SPECIFICATION forming part of Letters Patent No. 310,254, dated January 6, 1885.

Application filed October 23, 1883. (No model.)

*To all whom it may concern:*

Be it known that I, HIRAM S. COMBS, of Detroit, county of Wayne, State of Michigan, have invented a new and useful Improvement in Wire-Netting Machines; and I declare the following to be a full, clear, and exact description of the same, such as will enable others skilled in the art to which it pertains to make and use it, reference being had to the accompanying drawings, which form a part of this specification.

My invention consists of the combination of devices and appliances hereinafter specified, and more particularly pointed out in the claims.

Figure 1:
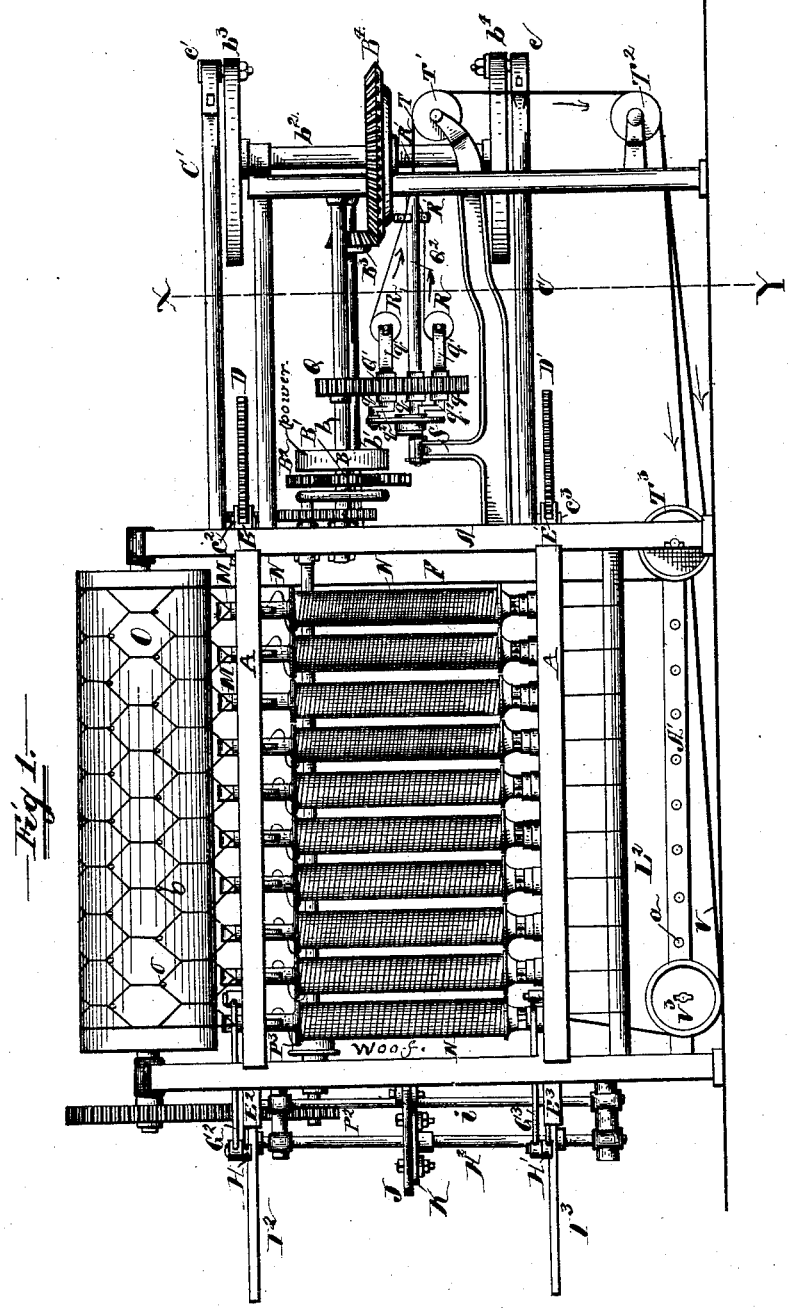
Figure 2:
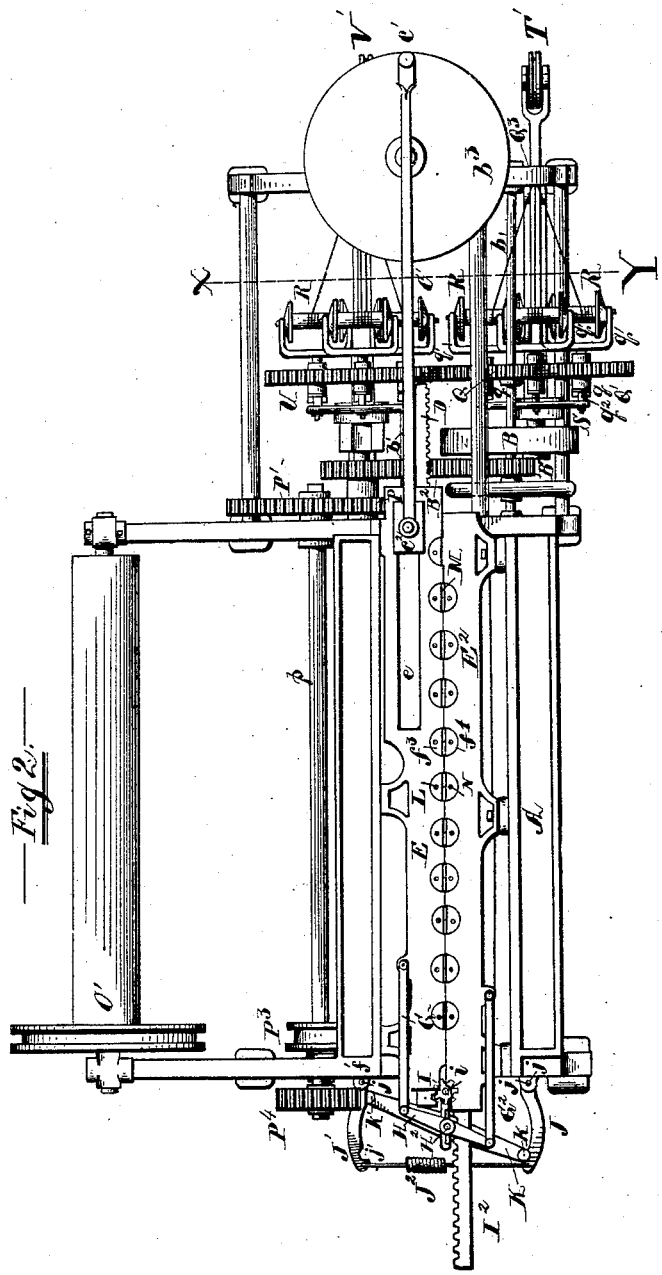
Figures 13, 14:
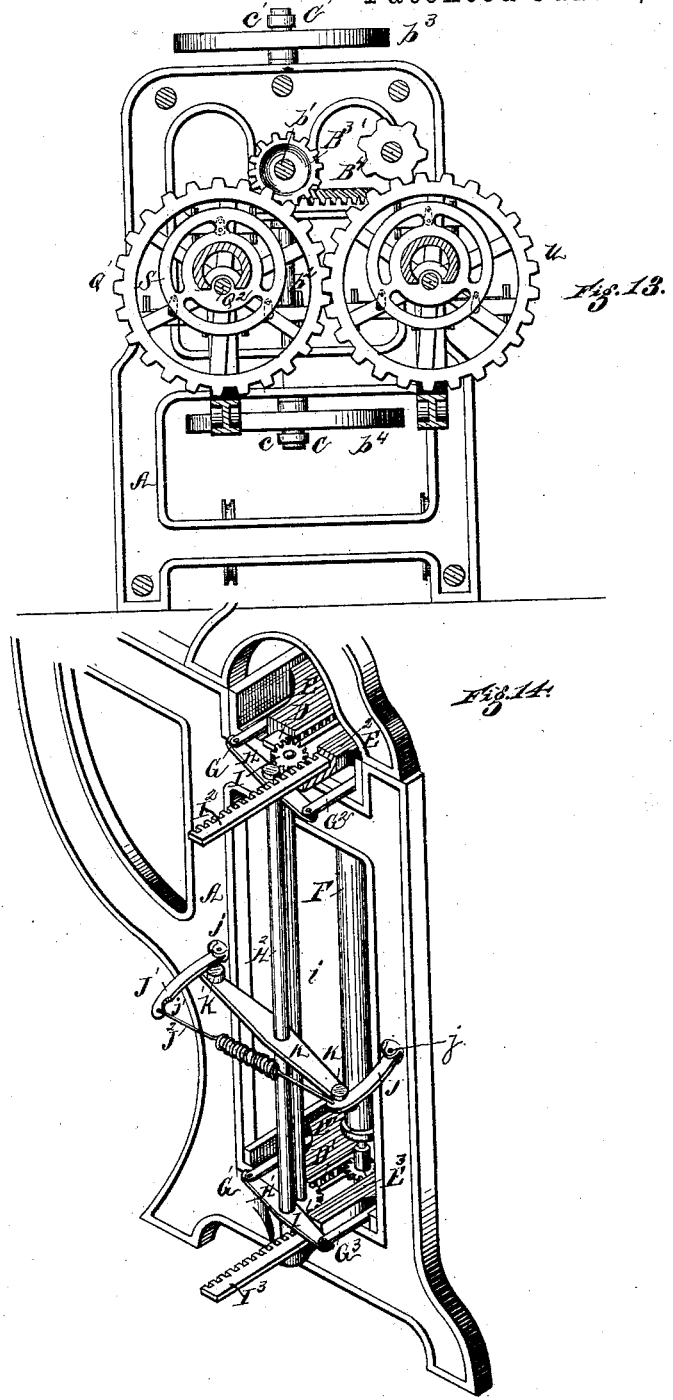

In the drawings, Figure 1 is a front elevation of a device embodying my invention. Fig. 2 is a plan view. Fig. 3 is an end elevation. Fig. 4 is an elevation of the opposite end. Fig. 5 is a vertical section through the line $x$ and $y$. Fig. 6 is a separate view of the bobbin and gears. Fig. 7 is a section of the same. Fig. 8 is a horizontal section through the rack-bars. Fig. 9 is a similar section showing the gears partially rotated. Fig. 10 is a similar section showing the gears carried half-way over. Fig. 11 is a detail view of the selvage mechanism in the rear elevation. Fig. $12^a$ is a separate side elevation of the same. Fig. $12^b$ is a separate view of the bearing. Fig. $12^c$ is a separate view of the fork. Fig. 13 is a vertical section of Fig. 1, looking toward the selvage mechanism, and taken just at the left of the wheel S. Fig. 14 is a perspective view showing the device for operating located at the left side of Fig. 1.

The object of my invention is to provide a machine for the manufacture of wire fencing. Heretofore great difficulty has been experienced, in the use of machines of this class, in netting a heavy grade of wire, such as is desirable for a durable and strong wire fencing.

It is the purpose of my invention to provide an improved machine adapted to weave heavy as well as light grades of wire, and also to combine with the woven fencing a strong selvage of two or more wires suitably twisted together and combined with the meshes of the fencing in the process of its manufacture.

It is also the purpose of my invention to provide a machine adapted to manufacture such a fencing which shall have more even and regular meshes than any fencing of this kind heretofore made, and which shall also be stronger and more symmetrical.

Hitherto much difficulty has been experienced in wire fencing of various sorts wherein the fencing or the selvage has consisted of a single wire, owing to the expansion and contraction caused by the action of heat.

It is the object of my invention, furthermore, to guard against this difficulty, which I accomplish by constructing the selvage of two or more, preferably three, wires twisted together, whereby the elasticity of two or more wires thus twisted tends to compensate for the contraction and expansion of a single wire.

It is my object, also, to provide an improved machine for the manufacture of all kinds of wire-netting, as I do not limit myself to the manufacture of fencing.

I carry out these objects as follows:

As illustrated in the drawings, A represents any suitable supporting-frame.

B is a driving-pulley mounted on a shaft, $b$. B' is a driving-pinion mounted upon the shaft $b$, adapted to mesh with the driving-gear $B^2$, said gear mounted upon the shaft $b'$. The shaft $b'$ is provided with a beveled pinion, $B^3$, meshing with the beveled gear $B^4$, mounted upon the shaft $b^2$, said shaft provided with balance-wheels $b^3$ and $b^4$.

C is the lower pitman, and C' is the upper pitman. Each pitman is suitably connected with one of the balance-wheels—as, for instance, by wrist $c$ or $c'$, preferably made adjustable, so as to give any desired throw to the pitman. The upper and lower pitmen are also connected with head-blocks $c^2$ and $c^3$. The head-blocks $c^2$ and $c^3$ are suitably connected with rack-bars D and D', and are adapted to slide in the slots $e$ of the slides E and E', said head-blocks forming a contact with said slides at the extremities of the slots.

F represents a series of bobbins, of any desired number. Said bobbins are adapted to revolve upon the spindles $f$. These bobbins are provided at their lower ends with a divided gear, $f'$ and $f^2$, and at their upper ends with a divided gear, $f^3$ and $f^4$. (See Figs. 6 and 7.) These bobbins are secured to the divided gears at the bottom by means of a collar, $f^5$, and at the top they are hinged to the half-gear $f^4$, as shown at $f^6$. The rack-bars D and D' are adapted to mesh with these divided gears at the top and bottom of the spindles. Said rack-bars are also suitably connected with the head-blocks $c^2$ and $c^3$, so that when said head-blocks are projected through the slots $e$ the rack-bars will give to the bobbins one or more revolutions, as may be desired, before said head-blocks come in contact with the slides E and E'. Upon said head-blocks coming in contact with said slides, the slides are projected one-half the distance between the centers of two adjoining bobbins. Said slides are connected by suitable links, G and G', with the eveners H and H', said eveners mounted upon a shaft, $H^2$.

$E^2$ and $E^3$ represent additional slides, which, with the slides E and E', form the bearing of the divided gears of the bobbins. The slides $E^2$ and $E^3$ are also provided with links $G^2$ and $G^3$, connected upon the eveners H and H'. By this construction it is evident that when the slides E and E' are forced in one direction the slides $E^2$ and $E^3$ will be forced in the opposite direction an equal distance, and thereby the divided gears will also be projected in the opposite direction, so that the half-gear of one bobbin will coincide with the half-gear of the adjacent bobbin throughout the series.

I represents suitable gears mounted upon the upper and lower ends of the shaft $i$, and adapted to mesh with the rack-bars D and D', and to mesh with additional rack-bars $I^2$ and $I^3$. These rack-bars $I^2$ and $I^3$ are adapted to mesh with the divided gears upon the bobbins and to move forward the half-gears adjacent thereto upon the movement of the slides E and E'. These rack-bars may be located in any suitable manner—as, for instance, they may be inserted in suitable grooves in the slides.

J and J' represent locking-arms suitably pivoted or hinged upon the frame, as shown at $j$, and are connected at their opposite ends by means of a suitable spring, $J^2$. These arms are provided with locking-grooves $j'$, adapted to receive the rollers $k$ and $k'$, located upon the ends of the evener K, said evener keyed upon the shaft $H^2$. It will be seen that when the roller $k$ is engaged in the locking-groove of the arm J the slides are located in such a position that the adjacent half-gears may be suitably rotated, and when the slides are reciprocated in the opposite direction the roller $k'$ will be engaged in the locking-groove of the arm J', and the slides will again be locked with the adjacent half-gears until the bobbins are again rotated as desired. The method of operating the bobbins is now evident. The wire warp L, leading from the spools L', runs under a suitable roller, $L^2$, thence upward through the half-gears $f'$ outside of the bobbin, and through the half-gears $f^3$ at the top of the bobbin.

M represents a series of arms, secured preferably to the half-gears $f^4$. They may, however, if preferred, be secured to the half-gear $f^3$, or said arms may be made in two parts, one of said parts secured to each of said half-gears. I would have it understood that I do not limit myself to any particular method of securing said arms to said gears. Said arms are designed to project upward, as shown, so that the wires to be twisted will be carried upward and be twisted over their upper edges, as by this means a much more perfect twist can be made than would be the case if the wires were twisted nearer to the ends of the gears.

N represents the wire woof coiled about the bobbins, and passing forward through the half-gears $f^4$ to the top of the arms M, meeting the wires L at that point, at which point it is evident the wires will be twisted upon the rotation of the bobbins. The meshes of the wire fencing are caused by the reciprocation of the slides carrying the divided gears.

O is a roller over which the fencing is carried after being twisted over the edges of the arms M, said roller provided with suitable spurs, $o$, to carry the fencing forward away from the machine, after which it may be wound upon any suitable reel, O', said reel driven by a friction-belt, $O^2$.

P is a pinion mounted upon the shaft $b'$, meshing with the gear P' upon the shaft $p$, said shaft also provided at its opposite end with a gear, $P^2$, and flanged pulley $P^3$ for driving a reel. $P^4$ is an intermediate gear meshing into a suitable gear, $O^3$, upon the roller O to drive said roller.

I will now proceed to describe the mechanism for the manufacture of the selvage. Upon the driving-shaft $b$ is a pinion, Q, meshing with a gear, Q', upon the shaft $Q^2$. The gear Q' is provided with a suitable number of hubs, $q$, preferably three in number.

$q'$ represents a series of rotary forks having their bearings in the hubs $q$ of the gear Q', said forks provided with a spindle carrying the spools R, which may be removably secured upon said spindles, said spools carrying the wire of which the selvages are composed. The shafts $q^5$ of said forks are suspended so as to pass through the hubs $q$, and are provided upon their ends opposite the spools with cranks $q^2$. Said cranks are secured upon the wheel S by means of connecting-wrists $q^3$. The said wheel S has its bearings at a suitable distance from the shaft $Q^2$, said distance corresponding with the length of the crank $q^2$. It will be seen that by this construction as the gear Q', with the forks carried in its hubs, revolves the connection of the cranks $q^2$ to the wheel S will cause the spools to be always kept the same side uppermost in the process of said revolution. The wires from said spools are led through a suitable bearing or collar, $Q^3$, more particularly shown in Fig. $12^a$, and through the bearing of the shaft $Q^2$, and are twisted by the revolution of the gear Q', as shown at R'. The selvage T passes over the rollers T' and $T^2$ and under the roller T³, through the half-gears $f$ at the base of one of the outside bobbins, thence forward outside the bobbin and through the half-gear $f^2$, upon the opposite extremity of said bobbin, and over the upper edge of the arm M adjacent thereto, at which point it is twisted together with the warp coming from the bobbin, the selvage taking the place of the woof upon one of the outside bobbins.

U is an additional gear, the duplicate of the gear Q', and provided with duplicate mechanism, already described, for carrying and twisting the wire of which the opposite selvage is composed, the said selvage V passing over the rollers V' and V², thence under to roller V³, and upward through the half-gear of the opposite bobbin in the manner already described, at the top of which it is twisted with the wire upon said bobbin to form the opposite selvage.

In the manufacture of fencing from light wire, as heretofore practiced, a single set of rack-bars, D and D', have been employed; but when it has been attempted to manufacture fencing of heavy wire with a single set of rack-bars and half-gears upon the bobbins, they refuse properly to turn, and are liable to become locked and to spread the slides apart, thus breaking the machine and stopping the work. By the employment of the additional rack-bars I² and I³, driven by the pinions upon the shaft $i$, this difficulty is overcome. This mechanism is thus adapted to manufacture wire fencing, or wire-netting of any description, of much heavier wire than has heretofore been employed, while at the same time it will operate readily and smoothly.

The rollers T³ and V³ may be adjusted upon the bar A', said bar being constructed with a series of bearings, $a$, for this purpose. By adjusting said rollers nearer together or farther apart, as the case may be, leaving off or adding the required number of bobbins, the fencing may be made of any desired width upon the same machine. The selvages T and V, I prefer to twist in opposite directions, and to unite them also in opposite directions upon the warp and woof.

What I claim is—

1. In a wire-netting machine, the combination, with one or more bobbins, each provided with a gear upon each end, of the arm M, substantially as described.

2. The combination, in a wire-netting machine, of two sets of slides, E E', E² E³, and two sets of rack-bars, D and D', I and I', adapted to mesh with divided gears upon the bobbins, substantially as and for the purpose described.

3. The combination, with a series of bobbins having divided gears, of two sets of slides provided with two sets of rack-bars adapted to mesh with said gears, said slides connected by eveners, substantially as described.

4. The combination, with a series of bobbins having divided gears, of two sets of slides provided with two sets of rack-bars adapted to mesh with said gears, said slides connected by eveners, and in connection therewith mechanism for suitably holding said slides as the rack-bars are reciprocated, substantially as described.

5. The combination, with two sets of slides, E E', E² E³, connected by eveners mounted upon a shaft, H², of an additional evener, K, mounted upon said shaft, and in connection therewith suitable locking-arms, J J', substantially as described.

6. The combination, with a series of bobbins having divided gears, of two sets of slides, two sets of rack-bars adapted to mesh with said gears, said slides connected by eveners mounted upon a shaft, an additional evener, K, mounted upon said shaft, and in connection therewith suitable locking-arms, substantially as and for the purpose described.

7. The combination, with a series of bobbins having divided gears upon each end, of two sets of slides, E E', E² E³, said slides each provided with a rack-bar adapted to mesh with said gears upon opposite sides, and means for suitably holding said slides in a given position while the wire is twisted, substantially as described.

8. In a wire-netting machine provided with a series of bobbins having divided gears on each end, the slides E and E², located at one end of said bobbins, the slides E' E³ at the opposite ends, said slides connected by eveners H and H', mounted upon the shaft H², and one of the slides at the top and bottom of the bobbins provided with a slot, $e$, the head-blocks adapted to slide in said slots, and the rack-bars connected with said blocks, substantially as described.

9. The combination, with a series of bobbins having divided gears, of two sets of slides forming the bearings of the divided gears, two sets of rack-bars adapted to mesh with said gears, and in connection therewith the gears I and I', suitably mounted upon a shaft, and adapted to mesh with said rack-bars, substantially as described.

10. The combination, with two sets of slides, E E' and E² E³, of the eveners H and H', mounted upon a shaft, said shaft provided with an evener, K, mechanism for holding said slides from being reciprocated while the wire is twisted, and in connection therewith gears I and I', and rack-bars with which said gears mesh, substantially as described.

11. In a wire-netting machine provided with a series of bobbins having divided gears, the slides E and E², located at the upper end of said bobbins, the slides E' and E³, located at the lower end of said bobbins, said slides forming the bearings of the bobbins and connected by eveners, and each provided with a rack bar, one of said slides at the top and bottom provided with a slot, $e$, and in connection therewith the rods C and C', provided with suitable cross-heads adapted to travel in said slots, said cross-heads secured to the rack-bars D and D', the construction being such that said rack-bars may be caused to travel the length of the slot and the slides to be then reciprocated, substantially as described.

12. In a wire-netting machine, the gear Q', mounted upon a suitable shaft, said shaft provided with two or more hubs, and the forks $q'$, carrying spools R, having bearings in said hubs, said bearings provided with cranks $q^2$, suitably secured upon a wheel, S, said wheel having its bearing at a distance from the shaft of crank $q^2$ corresponding to the length of said crank, all constructed and arranged substantially as and for the purpose described.

13. In a wire-netting machine consisting of the combination, with a frame and suitable driving-gear, of a series of bobbins provided with half-gears at the ends of the bobbins, two sets of slides forming the bearings of said gears, said slides provided with two sets of rack-bars, mechanism for reciprocating said rack-bars and slides, mechanism for holding the slides while the rack-bars are partially reciprocated, and in connection therewith suitable mechanism for twisting two or more strands, the construction being such that as the slides are reciprocated the half-gears will be interchanged and the warp and the woof of the selvage be suitably netted together by the rotation of the bobbins, substantially as described.

14. The combination, with a suitable frame, of a series of bobbins provided with half-gears at the ends of the bobbins, two sets of slides forming the bearings of said bobbins, said slides provided with rack-bars adapted to mesh with said divided gears at the top and bottom of the spindles, and in connection therewith suitable mechanism for reciprocating said slides and rack-bars, substantially as described.

In testimony whereof I sign this specification in the presence of two witnesses.

HIRAM S. COMBS.

Witnesses:
N. S. WRIGHT,
M. B. O'DOGHERTY.